FIG. I.

May 21, 1968     J. CZETLI, SR     3,384,159

PLASTIC MOLDING APPARATUS

Filed Dec. 21, 1966     2 Sheets-Sheet 2

JESS CZETLI, SR
INVENTOR
BY
Edward Hooper III
HIS ATTORNEY

3,384,159
PLASTIC MOLDING APPARATUS
Jess Czetli, Sr., West Pikeland Township, Chester County, Pa., assignor to The Alan I W Frank Corporation, O'Hara Township, Allegheny County, Pa., a corporation of Pennsylvania
Filed Dec. 21, 1966, Ser. No. 603,644
9 Claims. (Cl. 165—61)

ABSTRACT OF THE DISCLOSURE

Plastic molding apparatus of the type in which heating and cooling media flow successively through a passage in the mold during a molding cycle with provision for obviating passage of the heating and cooling media through a common supply line of substantial length before reaching the passage. A selector/directional check valve with connections to the sources of heating and cooling media is disposed immediately adjacent the mold casing, preferably mounted on the casing. Several molds may be manifolded.

---

Figure 1:
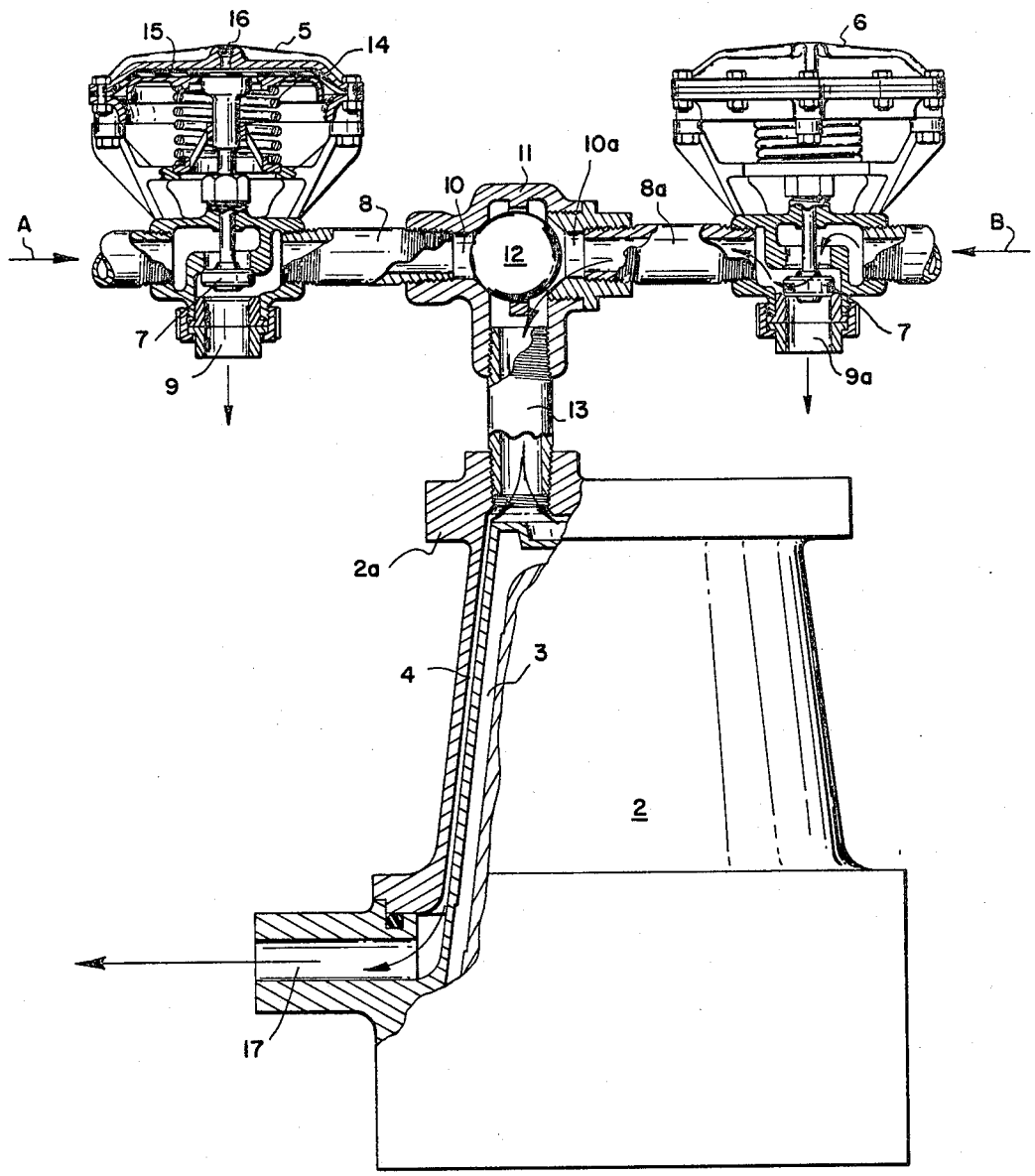

This invention relates to plastic molding apparatus, more particularly to plastic molding apparatus having means constituting a passage through the apparatus through which a heating medium and a cooling medium successively pass during a molding cycle. The invention provides means for greatly increasing the thermal efficiency of the plastic molding apparatus and as a consequence reducing the cycle time and increasing the output of the apparatus.

While my invention has wide application in the field of plastic molding apparatus of the type above referred to, for purposes of explanation and illustration the invention will be described as embodied in apparatus for the manufacture of containers or cups out of expandable fusible plastic material such, for example, as polystyrene beads containing an expanding or so-called "foaming" agent. Such beads are introduced into a mold wherein they are subjected first to a heating medium to expand the beads and then to a cooling medium to set the expanded beads in the form of a container or cup having the shape of the mold cavity. This is a technique known to those skilled in the art.

The heating medium may, for example, be steam and the cooling medium may, for example, be water, although other heating and cooling media may be employed. The mold may have adjacent and in thermoconductive relationship to the mold cavity a passage through which the heating medium and the cooling medium successively pass during a molding cycle.

Prior to the present invention steam and cooling water were conducted to the passage in the mold through the same supply line of substantial length. When the cycle changed from water to steam the water in the supply line was forced by the steam through the passage in the mold, delaying the time when the steam became effective for heating the material in the mold cavity. Moreover the water tended to cool and condense the steam, reducing the heating effect of the steam. When the cycle changed from steam to water the steam in the supply line was forced by the water through the passage in the mold, delaying the time when the water became effective for cooling the material in the mold cavity. The steam heated the water, reducing the cooling effect of the water.

I eliminate the supply line of substantial length through which the steam and water were conducted to the passage in the mold. This in turn eliminates the undesirable thermal effects described in the preceding paragraph and has resulted in a marked decrease in cycle time and increase in production per unit of time.

I provide plastic molding apparatus having means constituting a passage through the apparatus through which a heating medium and a cooling medium successively pass during a molding cycle, a selector/directional check valve adjacent and having its outlet in communication with said passage, a source of heating medium, conduit and valve means interposed between the source of heating medium and the first of the two inlets of the selector/directional check valve, such valve means being operable selectively between a first position directing heating medium from the source of heating medium to said first inlet and a second position shutting off the flow of heating medium from the source of heating medium and connecting said first inlet to drain, a source of cooling medium, and conduit and valve means interposed between the source of cooling medium and the second of the two inlets of the selector/directional check valve, such valve means being operable selectively between a first position directing cooling medium from the source of cooling medium to said second inlet and a second position shutting off the flow of cooling medium from the source of cooling medium and connecting said second inlet to drain, such arrangement of selector/directional check valve and conduits and valve means obviating passage of heating medium and cooling medium through a common supply line of substantial length before reaching said passage. The apparatus preferably includes a casing containing the first mentioned means with the selector/directional check valve disposed immediately adjacent and preferably mounted on the casing.

I further provide plastic molding apparatus comprising a plurality of molds each having a passage therethrough through which a heating medium and a cooling medium successively pass during a molding cycle, a manifold mounted on the apparatus, a plurality of selector/directional check valves, one for each mold, each selector/directional check valve being adjacent and having its outlet in communication with the passage through one of the molds, the manifold having a first duct communicating with the first of the two inlets of the selector/directional check valves and a second duct communicating with the second of the two inlets of the selector/directional check valves, a source of heating medium, conduit and valve means interposed between the source of heating medium and the first duct in the manifold, such valve means being operable selectively between a first position directing heating medium from the source of heating medium to said first duct in the manifold and a second position shutting off the flow of heating medium from the source of heating medium and connecting said first duct in the manifold to drain, a source of cooling medium, conduit and valve means interposed between the source of cooling medium and the second duct in the manifold, such valve means being operable selectively between a first position directing cooling medium from the source of cooling medium to said second duct in the manifold and a second position shutting off the flow of cooling medium from the source of cooling medium and connecting said second duct in the manifold to drain, such arrangement of manifold, selector/directional check valves and conduits and valve means obviating passage of heating medium and cooling medium through common supply lines of substantial length before reaching said passages. The selector/directional check valves are preferably mounted directly on the mold casings. The manifold desirably has aligned openings receiving the selector/directional check valves with the ducts in the manifold extending substantially parallel to each other and lying on opposite sides of the aligned openings. The manifold is preferably in the form of a block of material, desirably a generally rectangular block of plastic material, in which the ducts are constituted by bores in the block. The aligned openings in the manifold may be constituted by windows cut through the block.

Other details, objects and advantages of the invention will become apparent as the following description of certain present preferred embodiments thereof proceeds.

Figure 2:
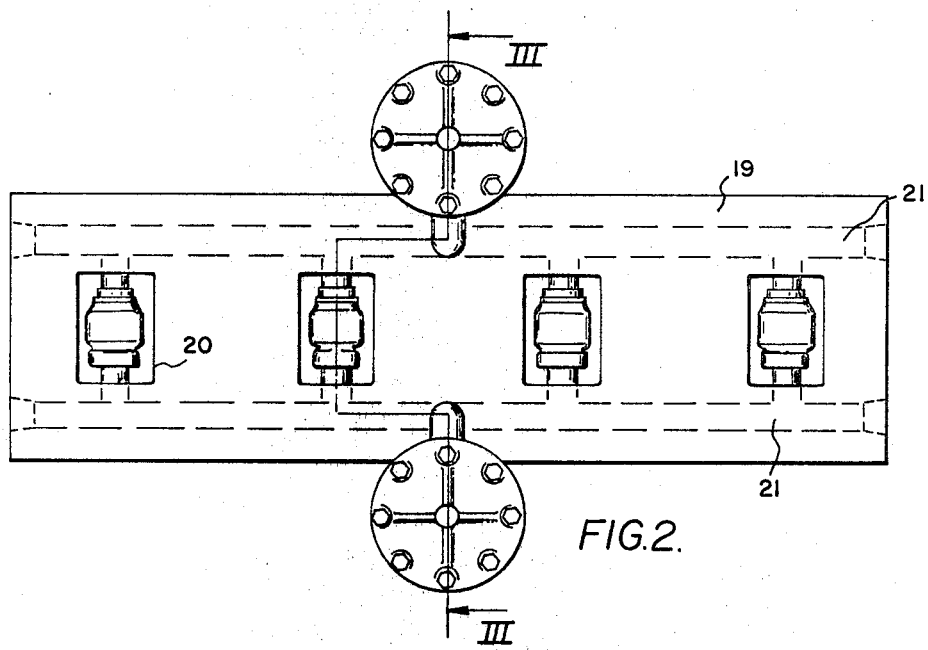
Figure 3:
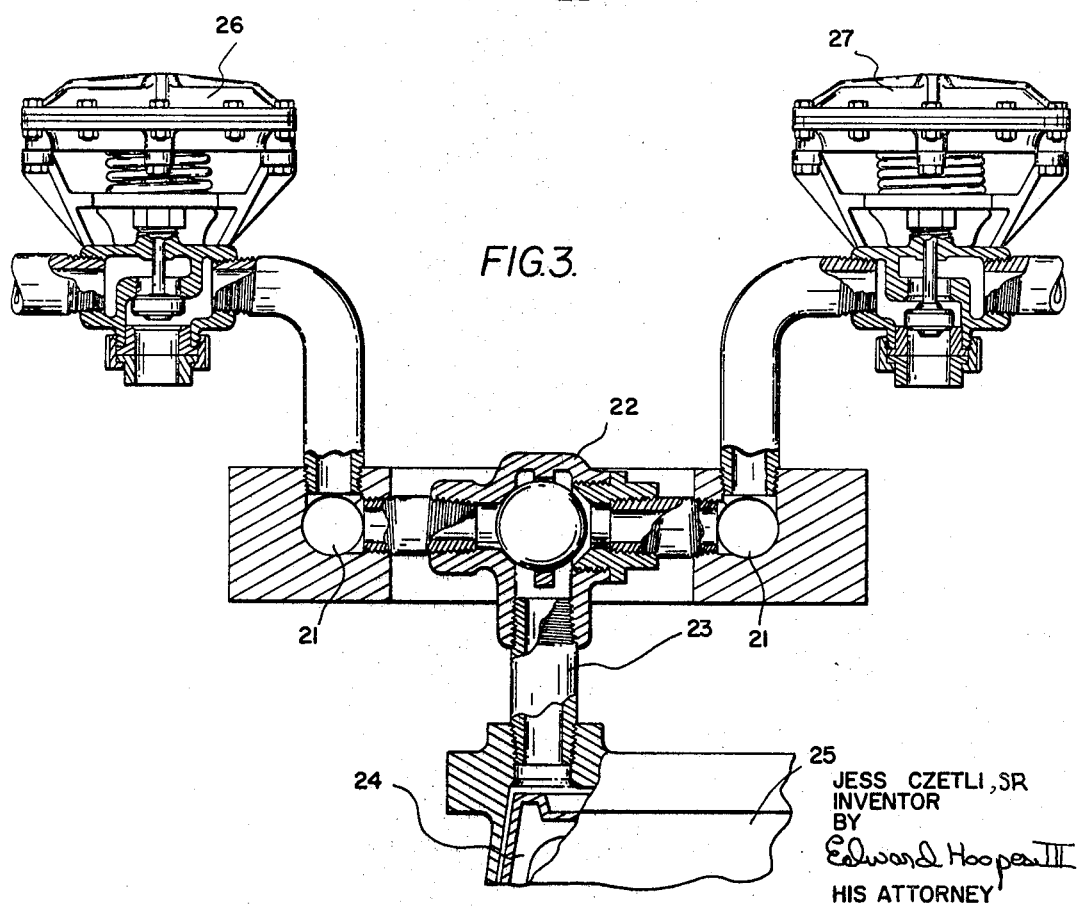

In the accompanying drawings I have shown certain present preferred embodiments of the invention in which FIGURE 1 is a transverse elevational view, partly in vertical cross-section, of plastic molding apparatus in accordance with my invention;

FIGURE 2 is a diagrammatic plan view of a manifold applied to a battery of four molds in which my invention is incorporated; and FIGURE 3 is a vertical transverse cross-sectional view to enlarged scale taken on the line III—III of FIGURE 2 and showing the upper portion of one of the molds to which the manifold is applied.

Referring now more particularly to the drawings and first to FIGURE 1, reference numeral 2 designates generally a mold for forming a cup out of expandable fusible plastic material such, for example, as polystyrene beads containing an expanding or so-called "foaming" agent. The mold may be of known construction having a mold casing 2a, the present invention residing in features other than the details of mold structure. In FIGURE 1 the mold 2 is shown as having a mold cavity 3 in which a cup is formed and a passage 4 through which a heating medium and a cooling medium successively pass during a molding cycle. The passage 4 is in thermoconductive relationship to the mold cavity 3.

The molding cycle may be conventional. Beads of polystyrene containing an expanding agent may be introduced into the mold cavity 3 in a manner known to those skilled in the art whereupon steam is passed through the passage 4 to expand the beads to form the cup in the mold cavity. Subsequently water constituting a coolant is passed through the passage 4 to set the expanded beads, after which the mold is opened and the cup removed.

The steam comes from any suitable source in the direction of the arrow A in FIGURE 1. The water comes from any suitable source in the direction of the arrow B in the same figure. Each of the steam and water passes through a 3-way valve, such valve for the steam being designated 5 and such valve for the water being designated 6. The valves 5 and 6 are identical so description of one will suffice for both.

Each of the 3-way valves has a valve element 7 movable between an upper position as shown in the valve 5 and a lower position as shown in the valve 6. In the upper position the valve element 7 closes off the supply of steam or water and opens communication between a conduit 8 and an outlet 9 to drain in the case of the steam and opens communication between a conduit 8a and an outlet 9a to drain in the case of the water. In the lower position the valve element 7 opens communication between the source of steam or water and the conduit 8 or 8a and closes the outlet to drain. The conduits 8 and 8a are connected respectively to the two inlets 10 and 10a of a selector/directional check valve designated generally by reference numeral 11 containing a ball valve 12 operable by pressure in the conduits 8 and 8a. When there is pressure in the conduit 8 higher than that in the conduit 8a the ball 12 is forced to the right viewing FIGURE 1 closing off the conduit 8a and opening communication between the conduit 8 and the passage 4 in the mold 2 through the mounting nipple 13 through which the selector/directional check valve is mounted directly on the mold casing 2a as shown in FIGURE 1. When there is pressure in the conduit 8a higher than that in the conduit 8 the ball 12 is forced to the left viewing FIGURE 1 closing off the conduit 8 and opening communication between the conduit 8a and the passage 4 in the mold 2 through the mounting nipple 13.

The 3-way valves 5 and 6 may be operated by any suitable source of power. They are shown as having a coil spring 14 tending to raise the valve element 7 to the upper position shown in the valve 5 in FIGURE 1 with a diaphragm 15 and a connection 16 to a source of fluid under pressure for moving the valve element downwardly to the lower position shown in the valve 6 in FIGURE 1. The fluid for operating the valves may be controlled by any suitable manual or automatic control mechanism.

The cycle of operation of the appartus may, as above stated, be conventional. After a finished cup has been removed from the mold the mold is closed and beads are introduced into the mold cavity in a manner known to those skilled in the art. The valve element 7 in the valve 5 is moved to its lower position closing the outlet 9 and establishing communication between the source of steam and the conduit 8. At the same time the valve element 7 in the valve 6 is moved to its upper position closing off the supply of water and connecting the conduit 8a to drain. The steam passing through the valve 5 moves the ball 12 of the selector/directional check valve to the right closing the conduit 8a and permitting the steam to flow through the mounting nipple 13 and the passage 4 and out of the mold at 17 to drain. A suitably controlled valve may be connected with outlet 17 to maintain the steam in the passage 4 for a period of time if desired or the steam may simply flow through the passage 4 to impart heat to the beads in the mold cavity 3. This is a matter of operation not involved in the present invention.

When the beads in the mold cavity 3 have been sufficiently heated by the steam in the passage 4 the positions of the valve elements in the 3-way valves 5 and 6 are reversed, opening the conduit 8 to drain and opening communication between the source of water and the conduit 8a. The ball 12 is moved to the left to the position in which it is shown in FIGURE 1 and the water from the conduit 8a passes through the nipple 13 and through the passage 4 and out to drain through the outlet 17.

Thus any common supply line of substantial length through which the steam and water successively pass is eliminated. The selector/directional check valve is disposed immediately adjacent the mold casing 2a and in the form shown is mounted directly on the mold casing through the mounting nipple 13. Any cooling and condensing of the steam by the water and heating of the water by the steam are minimized with marked increase in thermal efficiency, shortening of the cycle and increase in production.

FIGURES 2 and 3 show a manifold 19 which may be in the form of a rectangular block of plastic material having therein four aligned openings or windows 20 and two parallel longitudinal ducts 21 plugged at their ends. A selector/directional check valve 22 is mounted in each window 20 with its respective inlets connected with the ducts 21 as shown in FIGURE 3 and is connected through a mounting nipple 23 to a passage 24 in a mold 25. The 3-way valves 26 and 27 communicate respectively with the source of steam and the source of water and with the ducts 21 as shown. The operation is exactly the same as the operation above described in connection with FIGURE 1 except that four molds are manifolded, each mold having its own selector/directional check valve, a single pair of 3-way valves 26 and 27 serving to supply steam and water to the passages in all four molds through the manifold. The advantages of the invention are obtained in the manifolded structure the same as in the structure of FIGURE 1 as explained above.

While I have shown and described certain present preferred embodiments of the invention it is to be distinctly understood that the invention is not limited thereto but may be otherwise variously embodied within the scope of the following claims.

I claim:

1. Plastic molding apparatus having means constituting a passage through the apparatus through which a heating medium and a cooling medium successively pass during a molding cycle, a selector/directional check valve adjacent and having its outlet in communication with said passage, a source of heating medium, conduit and valve means interposed between the source of heating medium and the first of the two inlets of the selector/directional check valve, such valve means being operable selectively between a first position directing heating medium from the source of heating medium to said first inlet and a second position shutting off the flow of heating medium from the source of heating medium and connecting said first inlet to drain, a source of cooling medium, and conduit and valve means interposed between the source of cooling medium and the second of the two inlets of the selector/directional check valve, such valve means being operable selectively between a first position directing cooling medium from the source of cooling medium to said second inlet and a second position shutting off the flow of cooling medium from the source of cooling medium and connecting said second inlet to drain, such arrangement of selector/directional check valve and conduits and valve means obviating passage of heating medium and cooling medium through a common supply line of substantial length before reaching said passage.

2. Plastic molding apparatus as claimed in claim 1 including a casing containing the first mentioned means with the selector/directional check valve disposed immediately adjacent the casing.

3. Plastic molding apparatus as claimed in claim 1 including a casing containing the first mentioned means with the selector/directional check valve mounted on the casing.

4. Plastic molding apparatus comprising a plurality of molds each having a passage therethrough through which a heating medium and a cooling medium successively pass during a molding cycle, a manifold mounted on the apparatus, a plurality of selector/directional check valves, one for each mold, each selector/directional check valve being adjacent and having its outlet in communication with the passage through one of the molds, the manifold having a first duct communicating with the first of the two inlets of the selector/directional check valves and a second duct communicating with the second of the two inlets of the selector/directional check valves, a source of heating medium, conduit and valve means interposed between the source of heating medium and the first duct in the manifold, such valve means being operable selectively between a first position directing heating medium from the source of heating medium to said first duct in the manifold and a second position shutting off the flow of heating medium from the source of heating medium and connecting said first duct in the manifold to drain, a source of cooling medium, conduit and valve means interposed between the source of cooling medium and the second duct in the manifold, such valve means being operable selectively between a first position directing cooling medium from the source of cooling medium to said second duct in the manifold and a second position shutting off the flow of cooling medium from the source of cooling medium and connecting said second duct in the manifold to drain, such arrangement of manifold, selector/directional check valves and conduits and valve means obviating passage of heating medium and cooling medium through common supply lines of susbtantial length before reaching said passages.

5. Plastic molding apparatus as claimed in claim 4 in which the selector/directional check valves are mounted directly on the mold casings.

6. Plastic molding apparatus as claimed in claim 5 in which the manifold has aligned openings receiving the selector/directional check valves with the ducts in the manifold extending substantially parallel to each other and lying on opposite sides of the aligned openings.

7. Plastic molding apparatus as claimed in claim 6 in which the manifold is in the form of a block of material in which the ducts are constituted by bores in the block.

8. Plastic molding apparatus as claimed in claim 7 in which the aligned openings in the manifold are constituted by windows cut through the block.

9. Plastic molding apparatus as claimed in claim 8 in which the manifold is in the form of a generally rectangular block of plastic material.

References Cited

UNITED STATES PATENTS

| 2,357,706 | 9/1944 | Toepperwein | 165—101 X |
| 2,983,487 | 5/1961 | Mac Kay | 165—64 X |

FOREIGN PATENTS 663,479  12/1951  Great Britain.

ROBERT A. O'LEARY, *Primary Examiner.*

A. W. DAVIS, *Assistant Examiner.*